UNITED STATES PATENT OFFICE.

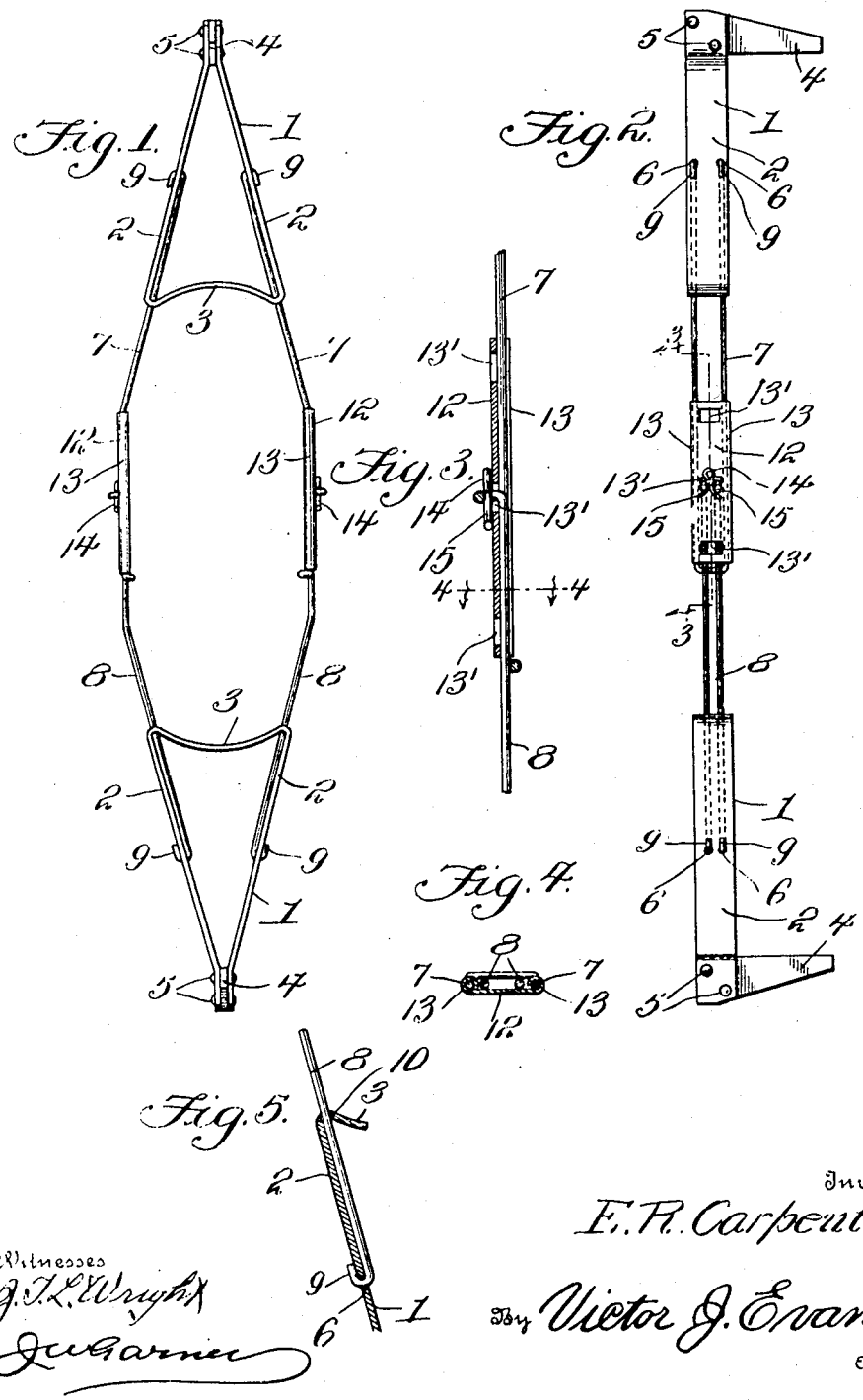

EUGENE R. CARPENTER, OF CHATTANOOGA, TENNESSEE.

CATTLE-YOKE.

1,227,383.   Specification of Letters Patent.   Patented May 22, 1917.

Application filed July 10, 1916. Serial No. 108,502.

*To all whom it may concern:*

Be it known that I, EUGENE R. CARPENTER, a citizen of the United States, residing at Chattanooga, in the county of Hamilton and State of Tennessee, have invented new and useful Improvements in Cattle-Yokes, of which the following is a specification.

This invention is an improved yoke for use on cattle to prevent them from breaking through fences and the like, the object of the invention being to provide an improved yoke of this kind which is extremely cheap and simple in construction, which can be readily adjusted to fit the neck of an animal of any size and which can be also readily disassembled to facilitate packing and transportation.

The invention consists in the features of construction, combination and arrangement of devices, hereinafter fully described and claimed.

In the accompanying drawings:—

Figure 1 is a front elevation of a yoke constructed and arranged in accordance with my invention.

Fig. 2 is a side elevation of the same.

Figs. 3 and 4 are detail views.

In accordance with my invention I provide a pair of end members 1, one of which in use fits above and the other below the neck of the animal on which the yoke is placed. Each number 1 is made of sheet metal, preferably steel, is substantially triangular in form, embodying sides 2 which converge in one direction and a curved connecting portion 3, which is adapted to fit above or below the neck as the case may be. A hook 4 which projects forwardly, has its rear end secured as by means of rivets 5 between the ends of the side members 2 of each end member. Each side is provided with a pair of openings 6.

The end members are adjustably connected together by oppositely arranged, U-shaped wires 7, 8. The said wires are formed with hooks 9 at their ends which are engaged with the opening 6, said wires passing through openings 10 near the ends of the curved connecting portions 3 of said members. Each U-shaped wire 7 is wider than the coacting U-shaped wire 8, the bight of the latter being arranged in the bight of the former so that said wires are arranged in partially overlapping relation. Each wider wire 7 is provided near its bight with a plate 12 of sheet metal, preferably steel, the sides of which are rolled around the sides of said wire 7 as at 13 and each plate 12 is provided with a series of transversely arranged adjusting slots 13. The wire 8 has the end of its bights out-turned and may be adjusted longitudinally on the plates 12 to arrange its bights in either of the slots 13 according to the size of the animal, and the bights of the wires 8 are then secured to the plates 12 by keys 14 which are preferably of the form here shown and which are passed through the out-turned ends of the bights of the wires 8 and arranged to bear on the outer sides of the plates 12, the arms 15 of the keys being then opened. This construction enables the yoke to be adjusted according to the size of the animal and also enables the parts of the yoke to be readily disassembled, so that the yoke can be readily packed in very small compass for storage or transportation.

Having described the invention, what I claim is:

1. A yoke of the class described comprising a pair of end members each having outwardly converging sides and a curved portion connecting the inner ends of the sides together, and wires connecting said end members together, said wires passing through openings at the inner corners of the end members and being attached to the side of said end members.

2. A yoke of the class described comprising end members, U-shaped arms attached to the end members and arranged in relative over-lapping relation and a plate attached to one of the wires at each side of the yoke and having attaching openings for engagement by the other wire and thereby causing the wires to adjustably connect the end members together.

In testimony whereof I affix my signature.

EUGENE R. CARPENTER.

Copies of this patent may be obtained for five cents each, by addressing the "Commissioner of Patents, Washington, D. C."